United States Patent
Nulman (10) Patent No.: US 9,689,381 B2
(45) Date of Patent: Jun. 27, 2017

(54) METHOD AND APPARATUS FOR RECOVERY OF PARASITIC ENERGY LOSSES

(71) Applicant: Yanir Nulman, Palo Alto, CA (US)

(72) Inventor: Yanir Nulman, Palo Alto, CA (US)

(*) Notice: Subject to any disclaimer, the term of this patent is extended or adjusted under 35 U.S.C. 154(b) by 0 days.

(21) Appl. No.: 14/655,809

(22) PCT Filed: Dec. 20, 2013

(86) PCT No.: PCT/US2013/076943
§ 371 (c)(1),
(2) Date: Jun. 26, 2015

(87) PCT Pub. No.: WO2014/105703
PCT Pub. Date: Jul. 3, 2014

(65) Prior Publication Data
US 2015/0330372 A1    Nov. 19, 2015

Related U.S. Application Data

(60) Provisional application No. 61/745,876, filed on Dec. 26, 2012.

(51) Int. Cl.
| F02B 63/04 | (2006.01) |
| F03G 7/08 | (2006.01) |
| H02K 7/18 | (2006.01) |
| H02K 35/02 | (2006.01) |
| H02K 7/00 | (2006.01) |

(52) U.S. Cl.
CPC ............... *F03G 7/08* (2013.01); *H02K 35/02* (2013.01); *H02K 7/006* (2013.01)

(58) Field of Classification Search
CPC .......................................... H02J 7/32
USPC ................................. 290/1 R, 1 A
See application file for complete search history.

(56) References Cited

U.S. PATENT DOCUMENTS

| 3,687,483 | A | * | 8/1972 | Gull | ............... | B60G 17/0152 |
| | | | | | | 267/64.16 |
| 3,833,094 | A | * | 9/1974 | Grossman | ............ | B60G 13/00 |
| | | | | | | 188/1.11 E |
| 6,234,654 | B1 | * | 5/2001 | Okuchi | ............... | B60Q 1/10 |
| | | | | | | 362/276 |

(Continued)

FOREIGN PATENT DOCUMENTS

| CN | 101550979 A | 10/2009 |
| JP | 03189223 A | * 8/1991 |

(Continued)

OTHER PUBLICATIONS

PCT/US2013/076943, International Search Report and Written Opinion, dated Apr. 10, 2014.

(Continued)

*Primary Examiner* — Pedro J Cuevas
(74) *Attorney, Agent, or Firm* — Patterson & Sheridan, L.L.P.

(57) ABSTRACT

A system for the recovery of parasitic energy loss in a vehicle includes a magnet and coil arrangement operatively and movable coupled with respect to one another, such that motion of the drive train of the vehicle with respect to the frame components causes relative motion therebetween to thereby induce an electrical current in the coil which may be used or stored in the vehicle.

19 Claims, 8 Drawing Sheets

(56) References Cited

U.S. PATENT DOCUMENTS

| | | | | |
|---|---|---|---|---|
| 6,841,970 B2* | 1/2005 | Zabramny | ............... | H02J 7/32 |
| | | | | 180/165 |
| 6,952,060 B2 | 10/2005 | Goldner et al. | | |
| 7,250,697 B2* | 7/2007 | Beaulieu | ............... | B60G 13/14 |
| | | | | 310/12.12 |
| 7,994,648 B1 | 8/2011 | Fielek | | |
| 8,941,251 B2* | 1/2015 | Zuo | ............... | B60G 17/06 |
| | | | | 290/1 R |
| 9,502,927 B2* | 11/2016 | Fang | ............... | G01P 3/22 |
| 2006/0125325 A1 | 6/2006 | Beaulieu | | |
| 2010/0109276 A1* | 5/2010 | Marjoram | ............... | B60G 99/002 |
| | | | | 280/124.157 |
| 2010/0187835 A1* | 7/2010 | Hohlfeld | ............... | B81B 3/0021 |
| | | | | 290/1 R |
| 2010/0219798 A1 | 9/2010 | Namuduri et al. | | |
| 2012/0104877 A1* | 5/2012 | Isaacs | ............... | H02K 35/02 |
| | | | | 310/30 |
| 2012/0193919 A1 | 8/2012 | Kuriki | | |
| 2013/0127268 A1* | 5/2013 | Atherton | ............... | G01P 3/22 |
| | | | | 310/46 |
| 2015/0069683 A1* | 3/2015 | Hochberg | ............... | F03G 7/08 |
| | | | | 267/140.11 |
| 2016/0134173 A1* | 5/2016 | Deak, Sr. | ............... | H02K 35/02 |
| | | | | 290/1 A |

FOREIGN PATENT DOCUMENTS

| | | |
|---|---|---|
| JP | 2004215375 A | 7/2004 |
| WO | 2012015488 A1 | 2/2012 |

OTHER PUBLICATIONS

EPO Supplementary European Search Report dated Sep. 23, 2016, for European Patent Application No. 13867483.3.

* cited by examiner

METHOD AND APPARATUS FOR RECOVERY OF PARASITIC ENERGY LOSSES

BACKGROUND

Field of the Invention

The present invention relates to the field of energy recovery, more particularly to the recovery of parasitic energy losses incurred in vehicles, and conversion of that recovered energy into useable energy such as electrical energy.

Background of the Art

Wheeled and other tractive vehicles, such as automobiles, trucks, motorcycles and bicycles require an energy source in order to propel the vehicle. For example, in an automobile, the vehicle employs an energy source, typically either an internal combustion engine or a stored energy and motor source, such as is present in an electric vehicle, to enable powered rotation of a wheel to thereby move the vehicle incorporating the wheel over terrain, such as a highway. In a human powered vehicle, such as a bicycle, the power source is a rider or riders.

In such wheeled vehicles, the vehicle typically moves over an uneven surface, which may be caused by non-uniformity in the road surface created when the paving surface is placed over uneven terrain, or unintended unevenness caused by road erosion, debris on the roadway, or by the traversing of non paved surfaces, such as a track or pathway. As the vehicle traverses such terrain, this energy is lost parasitically, i.e., it is not contributing to the movement of the vehicle over the terrain. One common location where such energy is lost is in a vehicle suspension wherein the vehicle body is elastically coupled to the tractive elements of the vehicle, such as the vehicle wheels, in order to ameliorate the effect of the unevenness in the surface over which the vehicle is traversing on the frame, cargo or passenger portion of the vehicle.

In one common vehicle suspension, the frame is coupled to each of the wheels, or opposed ends of the axles, through an elastic member comprised of an axle side element, a frame side element, and an elastic coupling between the axle and frame side elements. There is additionally provided alignment and securement elements, to maintain a desired alignment of the axle and frame side elements, while the elastic element enables the axle and frame side elements to move toward and away from one another. As the vehicle encounters uneven terrain, the wheel will tend to move in the direction of, or away from, the frame portion of the vehicle, and the elastic element compresses or extends to reduce the motion of the frame upwardly and downwardly as the vehicle moves over the driving surface. Thus, when a surface protrusion, for example, a low hump or rise is encountered by the vehicle, the wheel will move in the direction of the frame, but a substantial portion of the energy and motion of the impact of the tire and wheel against the hump or rise will be taken up by the elastic element, such that the frame will become closer to the immediate driving surface, while the wheel remains substantially equidistant from the driving surface. Once the vehicle passes the hump or rise, the elastic element is moved in the opposite direction. When a depression is encountered in the driving surface, the opposite effect occurs, and the vehicle frame becomes further extended from the immediate driving surface, whereas the wheel maintains the same position vis a vis the driving surface, and once past the depression, the vehicle frame and body become closer together, compressing the elastic member. The expansion and contraction of the elastic member results in parasitic energy loss in the form of waste heat, the energy used to create the heat ultimately being supplied by the vehicle power source.

SUMMARY OF THE INVENTION

In one aspect, there is provided an energy recovery system, which may be readily incorporated into existing vehicle suspension features, which a plurality of magnet structures, spaced along a generally linear support device, which is transposed with a plurality of individual electrically conductive coils, such that each magnet is operatively disposed adjacent to one of the coils. In one aspect, the magnets extend within the coils, and in another aspect the magnets are disposed about the coil structure. In a further aspect, the magnets may be positioned along the support device with or without non-magnetic spacers therebetween. In another aspect, at least two magnets are provided, and at least one of the at least two magnets is not fixed in position with respect to another of the at least two magnets. In each case, one of the magnets and coil structures is connected to a frame side element of a vehicle, and the other to a wheel side element, such that relative motion of the frame and wheel side elements cause relative motion of the coils and magnets to generate electricity. Additionally, where one or more free magnets, such as where a free magnet and a fixed magnet associated therewith are employed, the free magnet need not be interconnected with a different vehicle element as the coils, as concurrent motion of the magnet structure holding the free and fixed magnets and a corresponding coil with result in continued spring type or reciprocating motion of the free magnet, and thus the generation of electricity where the free magnet moves with respect to a corresponding coil. Relative motion of the frame with respect to the wheel results in relative motion of the magnet with respect to the coil thereby generating electrical energy by virtue of faradays law, $\in = -n\, \Delta\phi/\Delta t$, where $\in$ is electrical power, n is a coil dependant factor, $\Delta\phi$ is the change in magnetic flux and $\Delta t$ is the change in time.

In a further aspect, the energy recovery system is provided in conjunction with a vehicle suspension having an annular element surrounding a suspension element, and a second element connected to the frame or wheel side of the suspension, and multiple, spaced, magnets are provided on magnetic element holders which extend from the second element, with or without non-magnetic spacers therebetween. Each of the magnetic bodies extends inwardly of a sleeve, and each sleeve includes a plurality of windings, spaced apart along the length of the sleeve with a spacing equivalent to the spacing between the magnets, such that an individual magnet may be discretely interposed within the circumference of each of the windings. As the vehicle encounters an uneven surface, motions between the frame and wheel sides of the vehicle will cause motion of the magnets within each winding in the linear direction of the sleeve, thereby inducing an electric current therein.

In another aspect, the windings are each individually connected to a rectifying circuit, and the electricity generated therein is supplied, via an appropriate conductive path, to the vehicle battery or another storage device. The windings may be connected in parallel to the storage, or the windings may be connected in series with the storage.

The individual windings may be provided around a sleeve, may be formed within the body of the sleeve, or provided within the sleeve. They may be formed of wire wound in one or more turns, or may be printed or otherwise deposited on or within the body of the sleeve. Additionally, they may be of sufficient strength to form part or all of the sleeve into which the magnetic elements extend.

Each of the aspect of the invention provide for recovery of at least a part of the energy lost in the vehicle suspension as the vehicle passes over an uneven traction surface.

DESCRIPTION OF THE EMBODIMENTS

Disclosed herein are multiple embodiments of an energy recovery system for a vehicle, such as a motor vehicle or a human powered vehicle, wherein an elastic coupling extends between the frame of the vehicle and the driving surface engaging element(s) of the vehicle, such as a wheel and tire arrangement. In these embodiments, energy is recovered from the vehicle as the vehicle encounters uneven terrain causing a change in energy of the elastic coupling.

Figure 1:
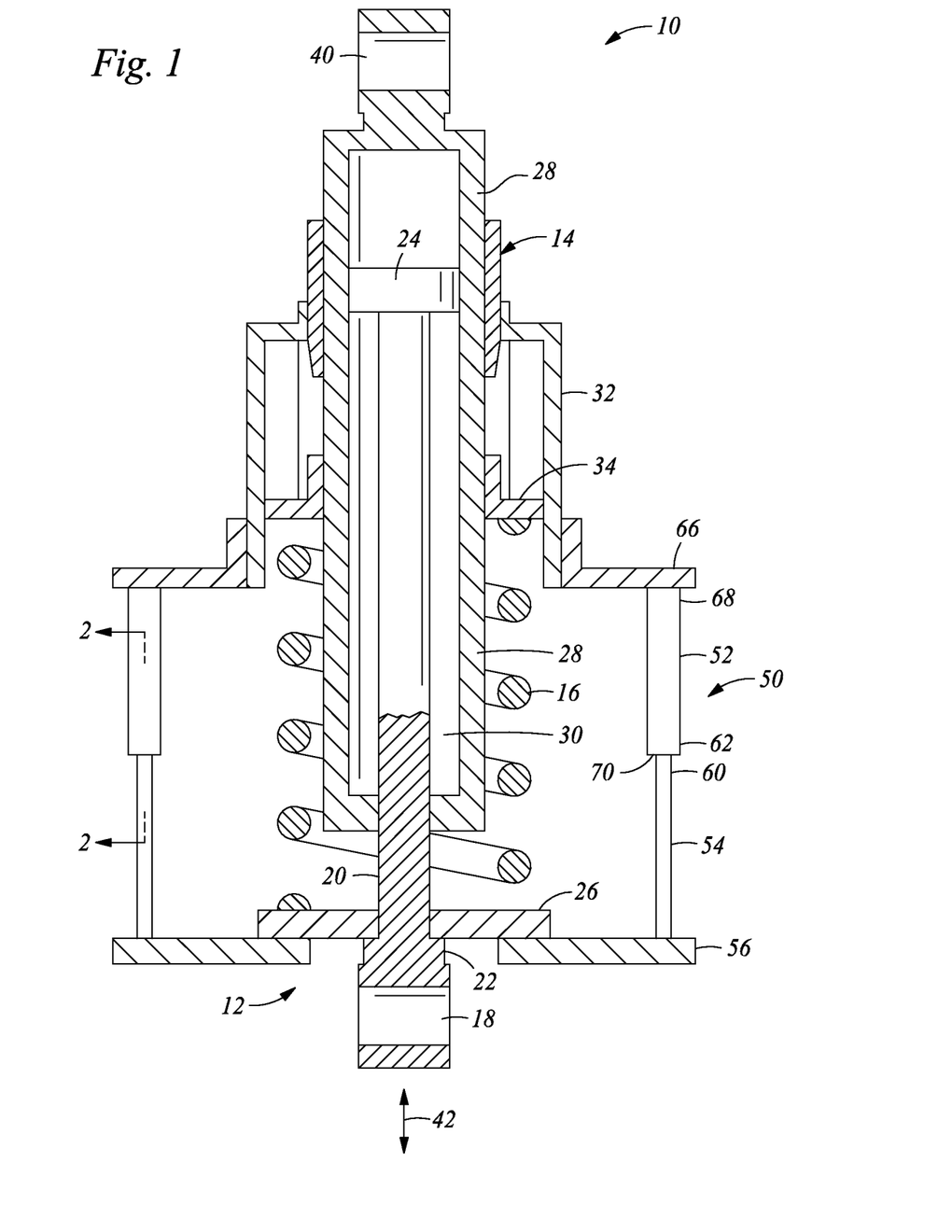
FIG. 1 is a sectional view of a vehicle suspension element incorporating the energy recovery system of the present invention.

FIG. 1 is a sectional view of an aspect of the invention, wherein a strut or shock absorber assembly is adapted to enable mounting of energy recovery system elements thereon. There is provided, as shown in FIG. 1, a vehicle suspension component 10, such as a shock absorber or strut, having a drive system side assembly 12 and a frame side assembly 14 operatively coupled to one another through a complaint or elastic element, such as a coil spring 16. The drive system side assembly 12 includes a connecting rod coupling 18, which may be coupled to an axle, a transaxle, or other wheel side component of the vehicle and which is positioned at the terminus 22 of an absorber rod 20 extending outwardly from the frame side assembly 14. At the opposed end of the rod 20 is provided a piston head 24, and intermediate the opposed ends of the rod 20, and immediately adjacent to the coupling 18, is provided an annular bearing plate 26.

Frame side assembly 14 is operatively coupled to, and moveable with respect to, the drive side assembly 12, and includes a body 28 forming a piston bore 30, into which rod 20 extends and piston head 24 is maintained in slidable securement, and an outer, annular bearing plate 26 facing, open cup shaped member 32 having an annular base 34 therein which is recessed from the end of the cup shaped member 32 and extends around the body 28. At the end of the frame side assembly opposite to the bearing plate is a second connecting rod coupling 40, which is connectable to a frame component (not shown). The piston 24 of the drive system side assembly 12 and the piston bore 30 cooperate to provide an enclosed gas volume which absorbs some portion of any energy which urges the rod 20 inwardly of the body 28.

The elastic member, in this aspect coil spring 16, extends between, and bears, at its opposed ends, upon the annular bearing plate 26 and the annular base 34 of the frame side assembly.

As a vehicle (not shown) incorporating the suspension component 10 encounters uneven terrain or an uneven driving surface, the rod 20, which is coupled through the connecting rod coupling 18 to the drive components of the vehicle such as a wheel, will tend to move inwardly and outwardly of the body 28. As further shown in FIG. 1, an energy recovery assembly 50 is provided to capture a portion of this energy and convert it to useful energy, such as electricity which may be stored for later use or unused immediately in the vehicle.

Energy recovery assembly 50 generally includes at least one coil housing 52 and at least one corresponding magnetic member 54, which cooperate together to convert relative motion of the body 26 and rod 20 into electrical energy. In this aspect of the embodiments, a magnet member plate 56 extends circumferentially from the drive side assembly 12 lower plate 26, such that a first end of the magnet member 54, which has a generally linear form, is secured thereto and extends therefrom, such that the second end 60 of the magnet member 54 extends inwardly of the coil housing 52. Similarly, a coil plate 66, is secured to, and extends circumferentially around and radially from the outer surface of the body 26 of frame side assembly 14, and a first end 68 of coil housing 52 is secured thereto. The coil housing 52 is a generally annular or tubular member, which extends from the coil plate 66 such that the magnet member 54 is received within an open end 70 of the coil housing 52. FIG. 1 shows two energy recovery assemblies 50 positioned around the circumference of the suspension component 10, although more, or as few as one, are contemplated herein. Additionally, the energy recovery assemblies need not surround the suspension component, but may be laid out along a line, in a triangular, elliptical or other arrangement which may or may not be symmetric with respect to the suspension component 10.

Figure 2:
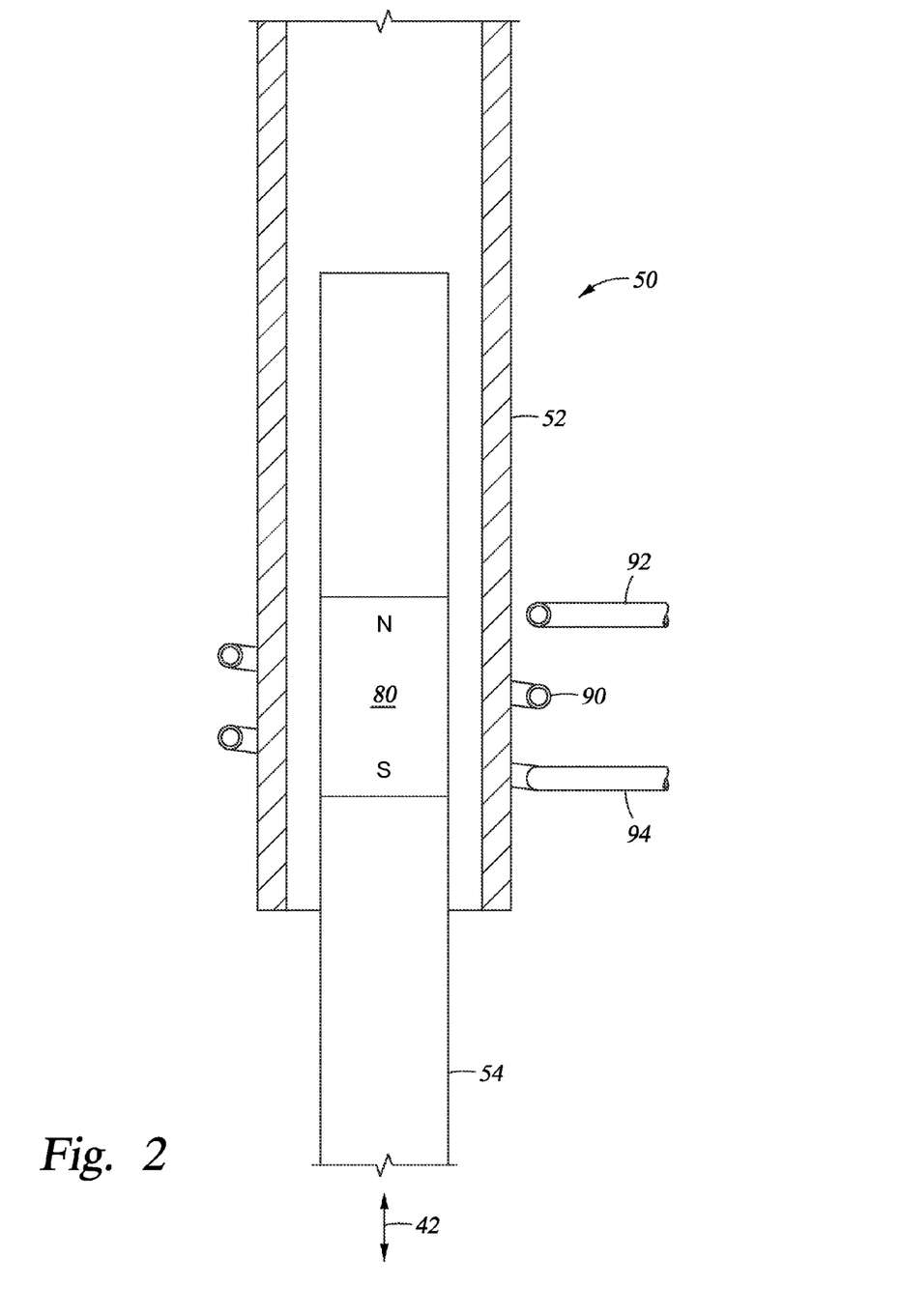
FIG. 2 is an enlarged partial view of the vehicle suspension element of FIG. 1, in section, showing details of the structure of the energy recovery elements thereof.

Referring now to FIG. 2, there is shown a partial, enlarged, sectional view of the energy recovery assembly 50 of FIG. 1 at section 2-2. Energy recovery assembly includes, in the aspect shown in FIG. 2, coil housing 52 having magnetic member 54 received and terminating therein, such that a magnet 80, carried with magnetic member 54, is positioned inwardly of coil housing 52 within the circumference of a coil 90 extending around the outer circumference of the coil housing 52.

Coil housing 52, is preferably comprised of a non-ferric material, such that the magnetic field created by the magnet 80 is not attenuated by the coil housing 52. Thus, the magnet member 54 moves upwardly and downwardly generally in the direction of double sided arrow 96 as the frame and drive components move as the vehicle traverses a surface, and the magnetic field of magnet 90 will induce an electric current in coil 90. Coil 90, as shown in FIG. 2, includes two turns, i.e., it has first and second leads 92, 94, and is wrapped around the outer circumference of the body 26 twice. Greater or fewer turns of the coil 90 may be incorporated based on the desired output of the coil and the physical limitations of the physical application space. The leads 92, 94 of the coil 90 are electrically connected to a rectifying circuit and a load for use of the electricity generated therefrom.

Figure 3:
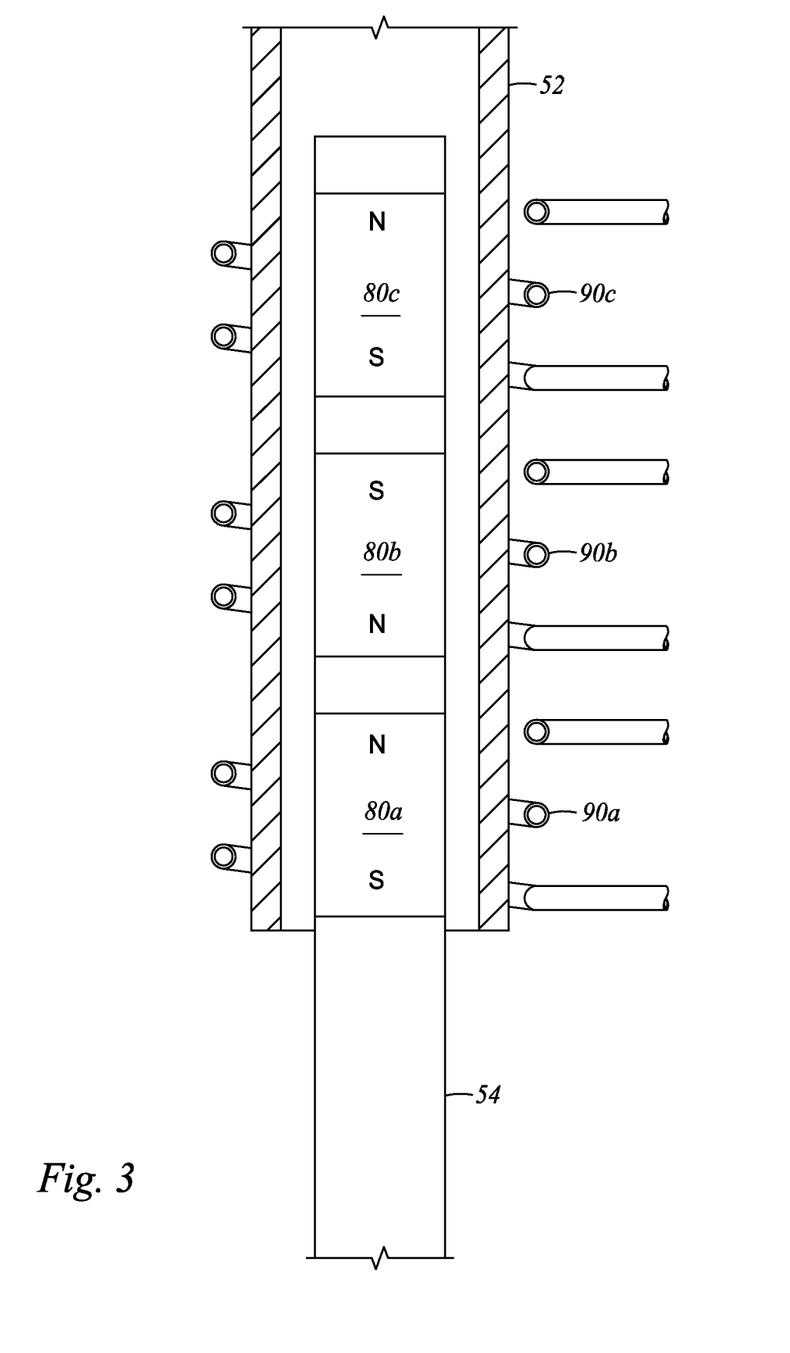
FIG. 3 is an enlarged partial view of the vehicle suspension element of FIG. 1, in section, showing details of an alternative structure of the energy recovery elements thereof.

Referring now to FIG. 3, a further embodiment of the energy recover system is shown in section. In this aspect, the energy recovery assembly 50 includes the magnet member 54 received within an open end of the coil housing 52, and the magnet member 54 includes a plurality of magnets 80a, 80b and 80c associated therewith. Additionally, coil housing 52 has a plurality of coil segments, in this case coil segments 90a, 90b and 90c, each corresponding and generally surrounding the position of a magnet 80a-c received within coil housing 52. Each coil includes a pair of leads and extends around the coil housing a plurality of turns, in the case of the coils in FIG. 3, two turns. The magnets are configured such that adjacent poles of the same polarity are in facing relationship. This will enable each magnet 80a-c to create a magnetic field which will separately pass through the adjacent coil 90a-c. The leads may be independently rectified and connected in parallel or series to a energy sink, such as a storage device or other load. Additionally, each of magnets 80a-c may be separated from one another along the length of magnet member 54 by a spacer, such as a dielectric material such as a plastic. The space provided by the spacer provided between adjacent magnets may be a small as 0.25 to 100 mm, and more preferably 1 to 15 mm. The size of the magnet 80, and the size of the coils 90, is selected to maximize the electrical recovery of the system.

Figure 4:
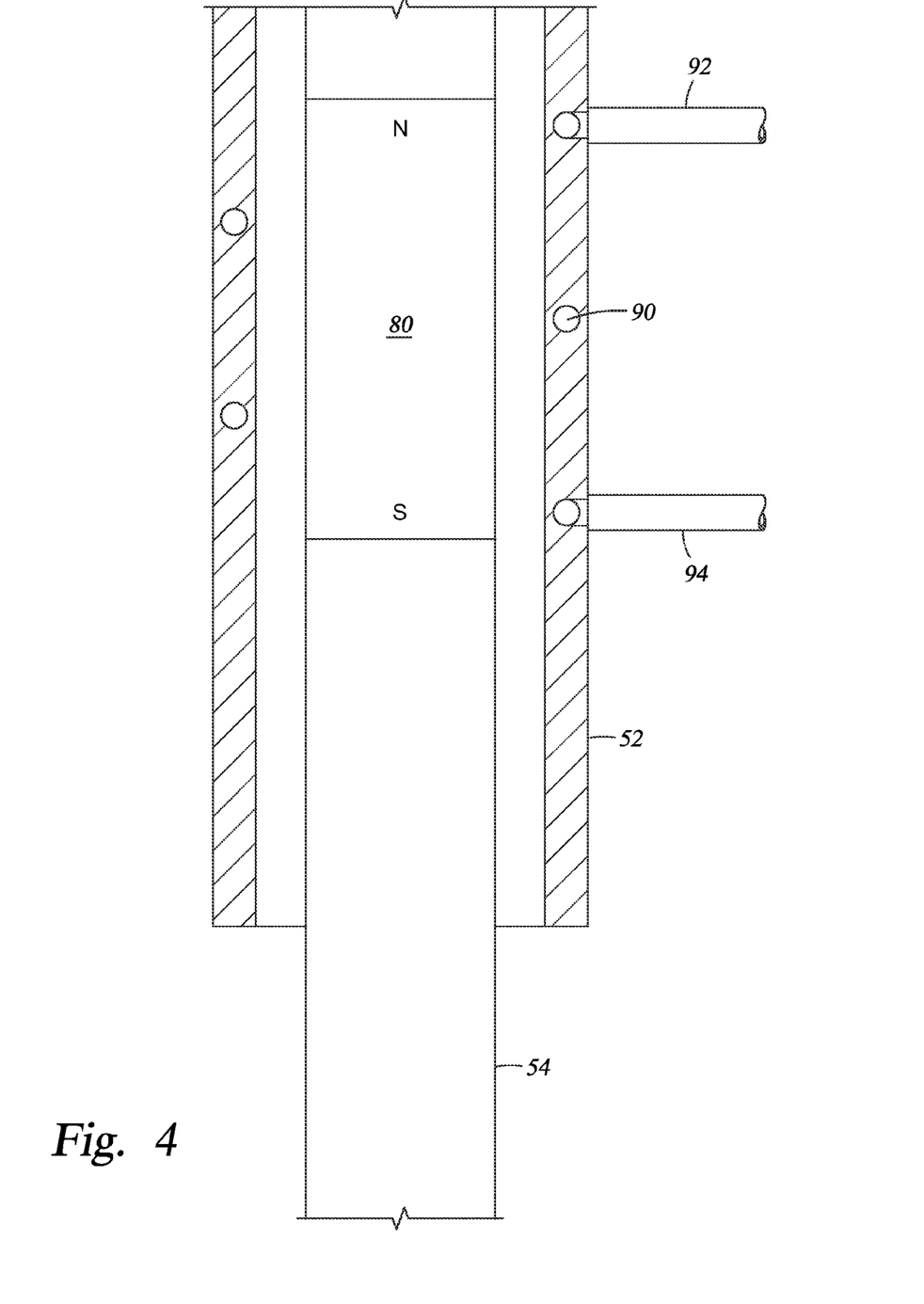
FIG. 4 is an enlarged partial view of the vehicle suspension element of FIG. 1, in section, showing details of an additional alternative structure of the energy recovery elements thereof.

Referring now to FIG. 4 there is shown another embodiment of the energy recovery system, wherein a single magnet 80 is provided on the magnet member 54, and a single coil is provided within, as opposed to around, the coil housing 52. In this embodiment, the coil is effectively encapsulated or buried within the housing 52, protecting the coil 90 from wear or fracture, and leads 92, 94 extend from housing for connection to a rectifying circuit and load. Additionally, coil 90 could be located within the housing 52.

In each of FIGS. 2 to 4, the magnets 80 are mounted on, or are incorporated within, magnet member 54, such that the magnets may be adhered with an adhesive to form a part of the magnet member, or may be physically secured within magnet member 54, such as by, for example, positioning the magnets 80 within a non-ferrous sleeve or housing and securing them in recesses therein, or by an adhesive.

Figure 5:
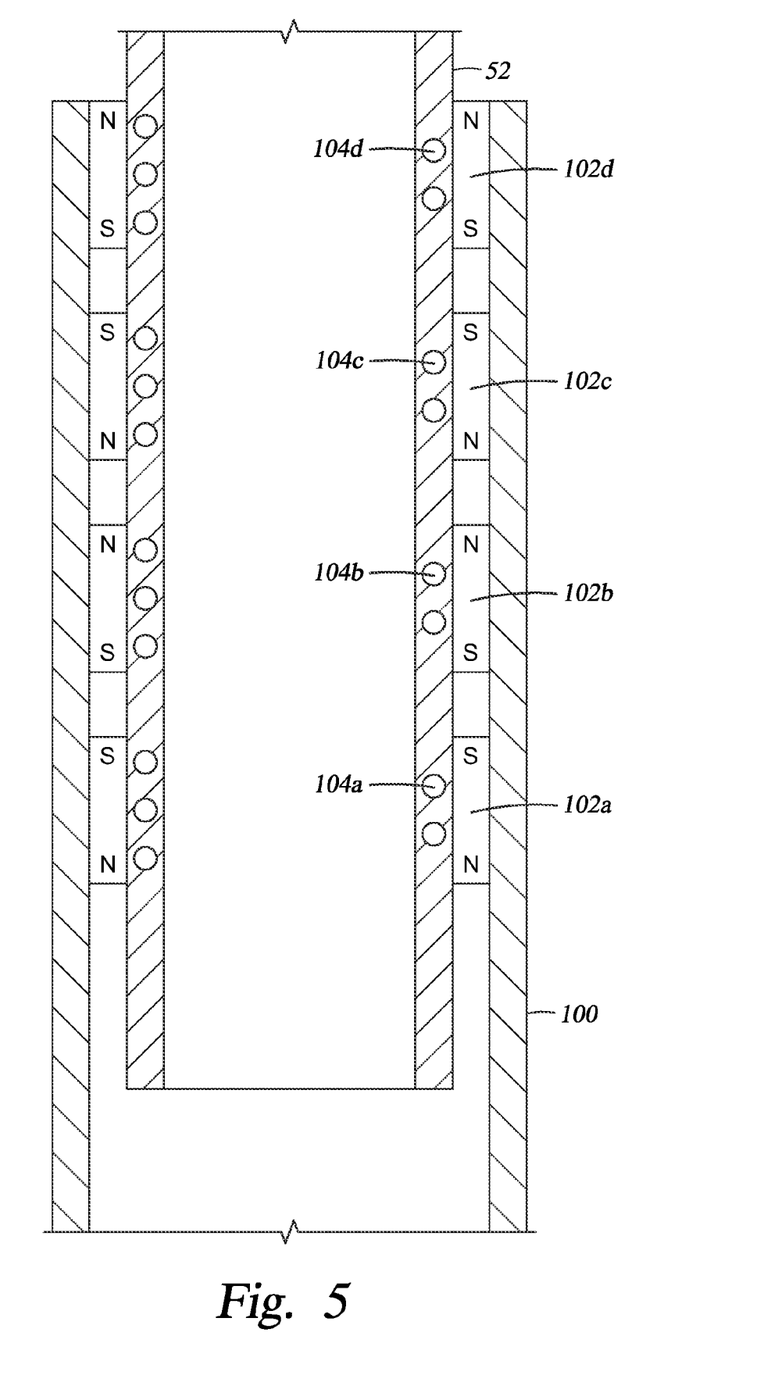
FIG. 5 is an enlarged partial view of the vehicle suspension element of FIG. 1, in section, showing details of another further additional alternative the structure of the energy recovery elements thereof.

Referring now to FIG. 5, there is shown an additional construct of the energy conversion device 50, wherein the individual magnet members are not rod shaped, but instead are formed as a hollow shaft 100 on or within which individual, ring shaped magnets, having a north and a south pole defined at their generally circular end faces, are provided. In this embodiment, a plurality of ring shaped magnet pieces 102a-d are provided on the hollow shaft 100, and, in contrast to the earlier embodiments, the magnets surround a plurality of discrete coils 104a-d received on a coil housing 52. In the construct shown, the coils 102a-d are embedded within a magnetically permeable material such as plastic, and each coil comprises a two turn coil with opposed leads (not shown) which are coupled to a rectifying circuit and load (not shown). Alternatively, the coils 104 a-d may be provided on, over, or within the body of the coil housing 52. Likewise, hollow shaft 100 can be received within the interior of the coil housing 52, to position each of the magnets adjacent to the individual coil segments.

Figure 8:
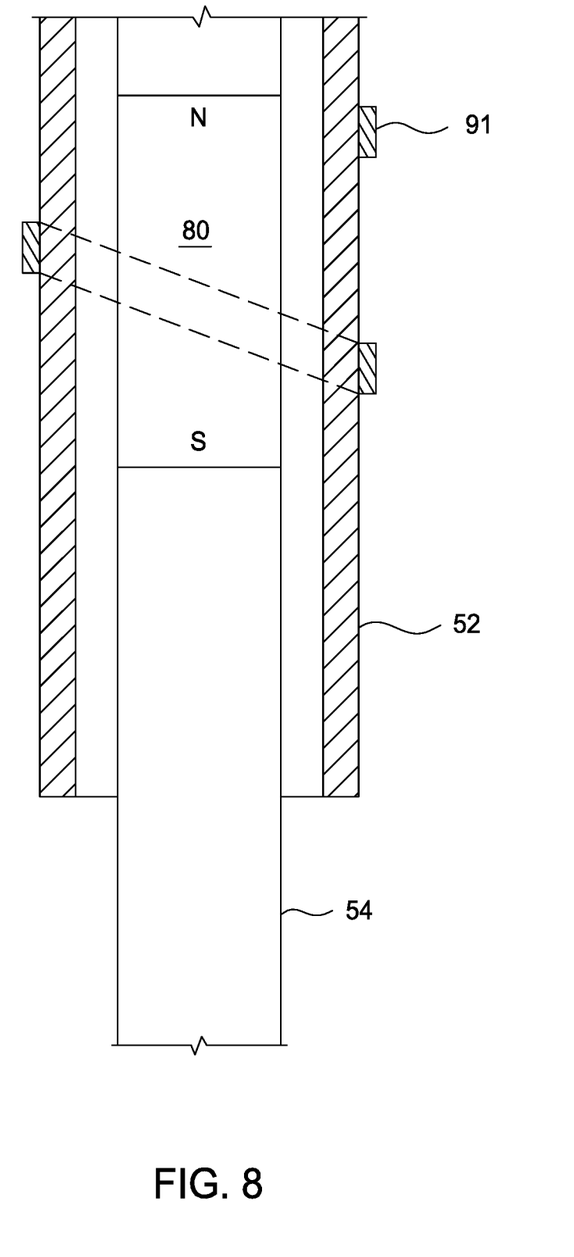
FIG. 8 is an enlarged partial view of a further alternative embodiment of the vehicle suspension system of FIG. 6.

Although the embodiments herein disclose the coil member 52 being attached to the frame side of the suspension component 10, the position of the coils and the magnets with respect to the suspension device components may be switched. Additionally, although the coils are described as discrete windings, they can comprise conductive traces as shown in FIG. 8 on or within the coil housing, or the coil housing may be configured as a housing having the coil forming a portion thereof.

FIG. 1 shows the magnet member 54 coupled to an extension (magnet member plate 56) coupled to the lower plate 26 of the drive side assembly of the suspension system 10, the configuration of FIG. 1 may be modified such that the lower plate 26 of the suspension assembly extends radially outwardly to secure the magnet members thereon, and the energy recovery system may be at least partially supported therewith. Additionally, the magnet member plate 56, and the coil plate 66, may be configured of two (or more) sections, preferably two symmetric hemispherical sections, which may be bolted together or to the suspension assembly 10, to enable retrofitting of the energy recovery system 50 to the suspension of a vehicle. Alternatively, instead of providing a continuous circumferential structure around the suspension 10, individual discrete supports may be provided on the frame 14 and drive side 12 components of the suspension for attachment of discrete coil and magnet sections of the energy recovery device thereto.

Figure 6:
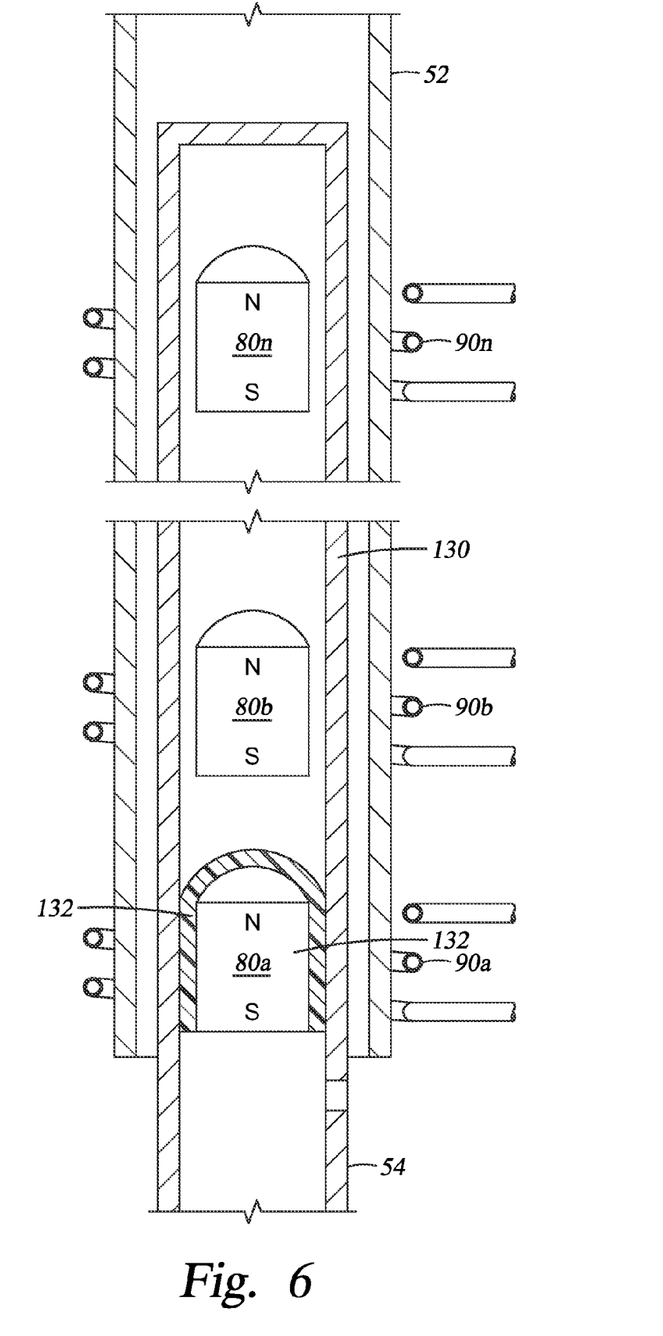
FIG. 6 enlarged partial view of the vehicle suspension element of FIG. 1, in section, showing details of another further additional alternative the structure of the energy recovery elements thereof.

Referring now to FIGS. 1 and 6, a further configuration of the energy recovery system is shown, wherein the magnets are allowed to float within the coil housing. As with the previous embodiments shown in FIGS. 1 to 4, frame side assembly 14 is operatively coupled to, and moveable with respect to, the drive side assembly 12, and includes a body 28 forming a piston bore 30, into which rod 20 extends and piston head 24 is maintained in slidable securement, and an outer, annular bearing plate 26 facing, open cup shaped member 32 having an annular base 34 therein which is recessed from the end of the cup shaped member 32 and extends around the body 28. At the end of the frame side assembly opposite to the bearing plate is a second connecting rod coupling 40, which is connectable to a frame component (not shown). The piston 24 of the drive system side assembly 12 and the piston bore 30 cooperate to provide an enclosed volume which absorbs some portion of any energy which urges the rod 20 inwardly of the body 28.

The elastic member, in this aspect coil spring 16, extends between, and bears, at its opposed ends, upon the annular bearing plate 26 and the annular base 34 of the frame side assembly.

As a vehicle (not shown) incorporating the suspension component 10 encounters uneven terrain or driving surface, the rod 20, which is coupled through the connecting rod coupling 18 to the drive components of the vehicle such as a wheel, will tend to move inwardly and outwardly of the body 28. As further shown in FIG. 1, an energy recovery assembly 50 is provided to capture a portion of this energy and convert it to useful energy, such as electricity which may be stored for later use or unused immediately in the vehicle.

Energy recovery assembly 50 generally includes at least one coil housing 52, and at least one corresponding magnetic member 54, which cooperate together to convert relative motion of the body 26 and rod 20 into electrical energy. In this aspect of the embodiments, a magnet member plate 56 extends circumferentially from the drive side assembly 12 lower plate 26, such that a first end of the magnet member 54, which has a generally linear form, is secured thereto and extends therefrom, such that the second end 60 of the magnet member 54 extends inwardly of the coil housing 52. Similarly, a coil plate 66, is secured to, and extends circumferentially around and radially from the outer surface of the body 26 of frame side assembly 14, and a first end 68 of coil housing 52 is secured thereto. The coil housing 52 is a generally annular or tubular member, which extends from the coil plate 66 such that the magnet member 54 is received within an open end 70 of the coil housing 52. FIG. 1 shows two energy recovery assemblies 50 positioned around the circumference of the suspension component 10, although more, or as few as one, are contemplated herein.

Referring now to FIG. 6, similarly to the configuration of the magnet member 54 of FIG. 3, in this embodiment the magnet member 54 includes a plurality of magnets 80a, b . . . n and each magnet 80 et. seq. is operatively associated with a coil 90 (Only 3 of magnets 80 and coils 90 are shown in FIG. 6, but the actual number of magnets, and corresponding number of coils, may be different based on the available space available for the magnets and coils, and the desired output of the energy recovery system). In contrast to the embodiment of FIG. 3, in this embodiment the lowermost magnet 80a is fixed within a non-magnetic tube 130, configured of, for example, plastic or non-ferrous metal, and the remaining magnets 80b, . . . n are positioned within the tube 130 and allowed freely float therein. Each magnet is associated with a coil, for example, magnet 80b and coil 90b, magnet 80n and coil 90n, etc. The magnets are positioned within the tube 130 such that the sides of the magnets 80 . . . are spaced from the adjacent wall of the tube 130, and adjacent poles of adjacent magnets have the same polarity, resulting in natural repelling of the magnets from one another resulting in a spacing there between which is a function of the mass of the magnets and the strength of the magnetic fields thereof. The centers of the length of the coils 90 a, b . . . n spaced on the exterior of the coil housing 52 are separated by this spacing. In this embodiment, the lowermost magnet 80 is fixed in place within tube 130 such as by use of an adhesive 132, or by press fitting of the magnet into the tube 130, or other fixing methodologies. The magnet member 54 is positioned, with respect to coil housing 52 such that in a free state, i.e., where the vehicle suspension is not compressed or extended, each magnet 80a, b . . . n is generally centered within a corresponding one of coils 90a, b . . . n. Thus, when the vehicle encounters uneven terrain, the magnet member 54 will move inwardly and outwardly of the coil housing 52. Because the lowermost magnet 80a is fixed within the tube 130, motion of magnet member 54 inwardly of coil housing 52 will cause the lowermost magnet to move inwardly of the housing, and the adjacent magnet 80b will likewise move inwardly because it is magnetically repelled from magnet 80b. Likewise the remaining magnets up to and including magnet 80n will move inwardly of the coil housing 52, and thus each magnet 80 will move with respect to an adjacent coil 90. However, as the spacing between the magnets is based on magnetic repelling of adjacent magnet poles of the same polarity, the spacing between the magnets will slightly shorten as the magnet member 54 moves inwardly of the coil housing 52. Then, when the magnet member 54 retracts from the coil housing, the magnets 80 b . . . n have momentum in the inwardly direction of the coil housing, and will continue to move inwardly of the coil housing until the force of gravity extinguishes their momentum and they then begin moving in an outwardly direction of the housing.

Because the magnets 80b, . . . n are not fixed with respect to the housing, when the magnet member 54 returns to a stationary position, the magnets 80b . . . n will continue to oscillate within their respective coils 90, and thus continue to generate electricity. As a result, the total length of time of the oscillation of a magnet within the coil is increased, resulting in a longer electricity generating period at the respective coils 90b . . . n.

Figure 7:
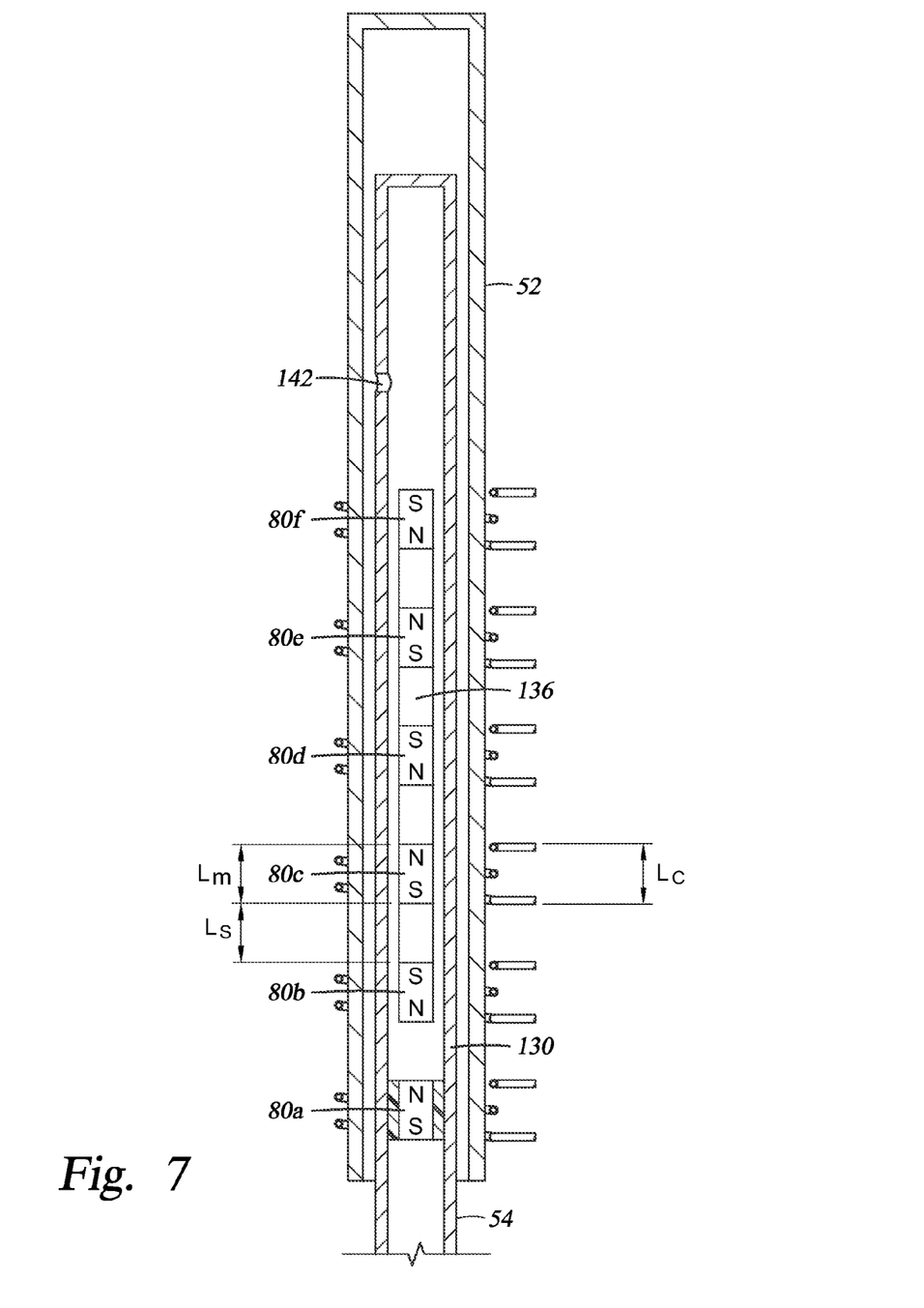
FIG. 7 is an enlarged sectional view of a further alternative embodiment of the vehicle suspension element of FIG. 6.

Referring now to FIG. 7, there is shown an alternative construct of the embodiment of FIG. 6, wherein the magnet member 54 includes at least one fixed magnet 80a therein, and at least one additional moveable magnet therein. In the structure shown in FIG. 7, a first magnet is provided within a tube 130, and is fixed therein such as by use of an adhesive or by press fitting or other securement methodologies. At least one additional magnet is provided within tube, and magnetically "floats" with respect to the first magnet 80a, by virtue of magnetic repulsion. This is ensured by placing common poles, for example the north poles N of adjacent magnets in facing relationship, and the south poles of adjacent magnets in facing relation, as is shown in FIG. 7. Additionally, in contrast to the embodiment of FIG. 6, in this embodiment, additional magnets are provided and are all moveable with respect to the first magnet 80a, but all of the moveable magnets, in this case magnets 80 b-f, are fixed with respect to one another. In this embodiment, this may be accomplished by providing non-magnetizable spacers 136 intermediate of, and adhered to the pole faces of with an adhesive, adjacent magnets 80b-f. The spacing between individual magnets 80b-f, which is provided by the spacer height and thickness of the adhesive between adjacent magnets and the spacer 136, is Ls. The magnets 80 each have a height, as measured between opposed pole faces thereof, of Lm.

A plurality of coils 90, equal in number to the number of magnets 80, are provided around the coil housing 52 in spaced relation to each other, adjacent to, and surrounding, the intended location of the magnets supported on the magnet member 54 extending inwardly of the open end of the coil housing 54. The coil 90 height is Lc. As shown in FIG. 7, the coils are generally spaced such that the center of their span, i.e. one-half of their height, is centered with the span of the magnets 80 between their pole faces, when the energy recovery system is in a free (unexpended or uncompressed) state. The coil height is preferable greater than that of the magnets, so that at least a portion of the magnets 80 remain within the cylindrical envelope of the corresponding coil 90 during use. The gap between adjacent magnets may be a small as 0.25 to 100 mm, and more preferably 1 to 15 mm. The size of the magnets 80, and the size of the coils 90, is selected to maximize the electrical recovery of the system.

As with the embodiment of FIG. 6, as a vehicle encounters uneven terrain, the magnet member 54 will move inwardly of the coil housing 52 and in so doing, the magnet 80a will move synchronously with the magnet housing 54, but the individual magnets 80b-f will move in the same direction generally as the magnet 80a, but, the spacing between the adjacent magnets 80a and 80b will change. As with the embodiment of FIG. 6, the magnets 80b-f will oscillate within the coils 90b-f semi-independently of the motion of magnet 80a, resulting in the generation of electrical energy for a longer period of time. Although in the embodiments herein a specific number of magnets or a specific number of energy recovery system elements surrounding an suspension system, the number of magnet s and systems may be selected by a user of the system, to obtain the desired electric wattage desired for a particular allocation.

Additionally, the arrangement of FIG. 7 may be modified by, for example, securing a plurality of magnets 80 to the coil housing and providing at least one, up to a plurality, of magnets 80, within and freely moveable in the housing. Further, the arrangement of FIG. 7 may be modified to include one or more magnets fixed to the interior of the magnet housing 52, leaving a gap therebetween within which one or more freely moveable magnets are positioned. Additionally, groups of freely moveable magnets may be employed, where at least two magnets are secured together with an adhesive or other securement method, and the group of magnets may move together within the magnet housing repelled by a fixed magnet such as magnet 80a of FIG. 7, or by fixed magnets secured to the tube with a gap therebetween, within which the group of magnets may move.

Although the magnet arrangements are shown in FIGS. 3 to 7 as having the same polarity of adjacent magnets in a facing position, groupings with some magnets having the same polarity facing one another, and others having those of opposite polarity facing one another, are also contemplated. Additionally, ring magnets may be provided about the outside of the tube as shown in FIG. 5, and cylindrical magnets may be located within the tube, as shown in FIG. 7, and one of the cylindrical or ring magnets affixed to the tube and the other free to move.

Additionally, because electricity will be induced in the coils in either direction of travel between the coils and magnets, the output of each coil need pass through a rectifier so that the output therefrom has a consistent positive or negative side. From there, the individual coils may be configured in series or in parallel, and then coupled to an energy sink, such as a power need in a vehicle or a battery, such as the battery of an electric car.

The invention claimed is:

1. An energy recovery system for parasitic energy losses in a vehicle having a frame element moveably coupled to a drive element wherein the vehicle includes a suspension system, comprising:
    a magnet member coupled to one of the frame element and drive element;
    a coil housing coupled to the other of the frame element and drive element and supporting a coil therewith;
    said magnet member including at least one magnet thereof positioned adjacent to, and moveable relative to, said coil supported on said coil housing; and
    the magnet member and coil housing are fixed to separate elements of the suspension system;
    wherein said magnet member includes a housing surrounding at least two magnets, wherein a second of the magnets is free to move, with respect to the first of the magnets, such that at least the second of the magnets moves adjacent to the coil, wherein the first and second magnets are spaced from one another by magnetic repelling forces maintained between the first and second magnets.

2. The system of claim 1, further comprising a plurality of magnet members and coil housings, one magnet member associated with one of the coil housing, and wherein the plurality of magnet members and coil housings are separately fixed to elements of the suspension system.

3. The system of claim 2, wherein the coil housing supports at least one coil therein, and the magnet member positions the magnet member with respect to the coil housing such that, upon a force tending to move the magnet member and coil housing with respect to each other occurs, the second magnet is disposed adjacent to the at least one coil.

4. The system of claim 3, wherein said magnet member positions at least one magnet about the exterior of the coil housing.

5. The energy recovery system of claim 2, wherein the suspension system includes:
    a piston housing;
    a rod, extending from a rod support, received within and moveable with respect to said piston housing; and
    an elastic member interposed between said piston housing and said rod support.

6. The energy recovery system of claim 5, wherein said magnet member is supported on, and extends from, said rod support and said coil housing is supported on said piston housing.

7. The energy recovery system of claim 5, further including an extension extending from said rod support, said magnet member is supported on, and extends from, said extension, and said coil housing is supported on said piston housing.

8. The energy recovery system of claim 5, wherein said magnet member includes at least one magnet operatively coupled to said rod, and, said piston housing incorporates said coil housing integrally therewith.

9. The energy recovery system of claim 1, wherein the coil is a conductive trace on a surface of the coil housing.

10. The energy recovery system of claim 1, wherein said housing includes a tubular member, and said magnets are received within said tubular member, and the first one of said magnets is fixed in position with respect to said tubular member and the second of the magnets is free to move with respect to the first magnet as guided by the tubular member.

11. The energy recovery system of claim 10, wherein a plurality of magnets are fixed to the tubular member, and a single magnet is free to move with respect to the plurality of fixed magnets.

12. A method of recovering energy in a vehicle; comprising
    providing a suspension having at least a frame side member, a drive side member, and an elastic member therebetween such that the frame and drive side members may move inwardly and outwardly with respect to one another;
    providing a coil housing having a plurality of coils disposed therewith in operative connection with one of the drive side and the frame side elements;
    providing a magnet member having a plurality of magnets disposed therewith in operative connection with the other of the drive side and frame side members, such that the magnet member positions a first magnet thereof adjacent to the coil of the coil housing;
    at least two of the plurality of magnets are moveable with respect to one another; and
    in response to movement induced between the coil and magnet by movement of the suspension, generating electricity in the coil.

13. The method of claim 12, wherein the number of magnets and the number of coils is the same.

14. The method of claim 12, wherein the coils are positioned around the exterior of the coil housing.

15. The method of claim 12, wherein the coils are a conductive traces on a surface of the coil housing.

16. The method of claim 12, wherein the coil and magnet assemblies are mounted outside the piston housing in a non circular pattern.

17. The method of claim 12, wherein the plurality of magnets includes a first magnet and a second magnet, and the second magnet freely oscillates in position with respect to the first magnet.

18. The method of claim 17, wherein the magnetic poles of the first and second magnets are in a facing relationship, and the facing poles have the same magnetic polarity.

19. An electrical energy generating device for use with a vehicle, comprising:
- a non-magnetic tube having a closed end;
- a first magnet within and moveable with respect to the tube;
- a second magnet secured within, but free to move, in the tube and with respect to the position of the first magnet; and
- a first coil located around the tube and adjacent to the position of the first magnet, and a second coil located around the tube and adjacent to the second magnet, wherein each of the first and second coils comprise at least one winding turn extending around an internal space therein and the first magnet is moveable in the internal space associated with the first coil and the second magnet is moveable in the internal space associated with the second coil.

\* \* \* \* \*